United States Patent Office 3,048,468
Patented Aug. 7, 1962

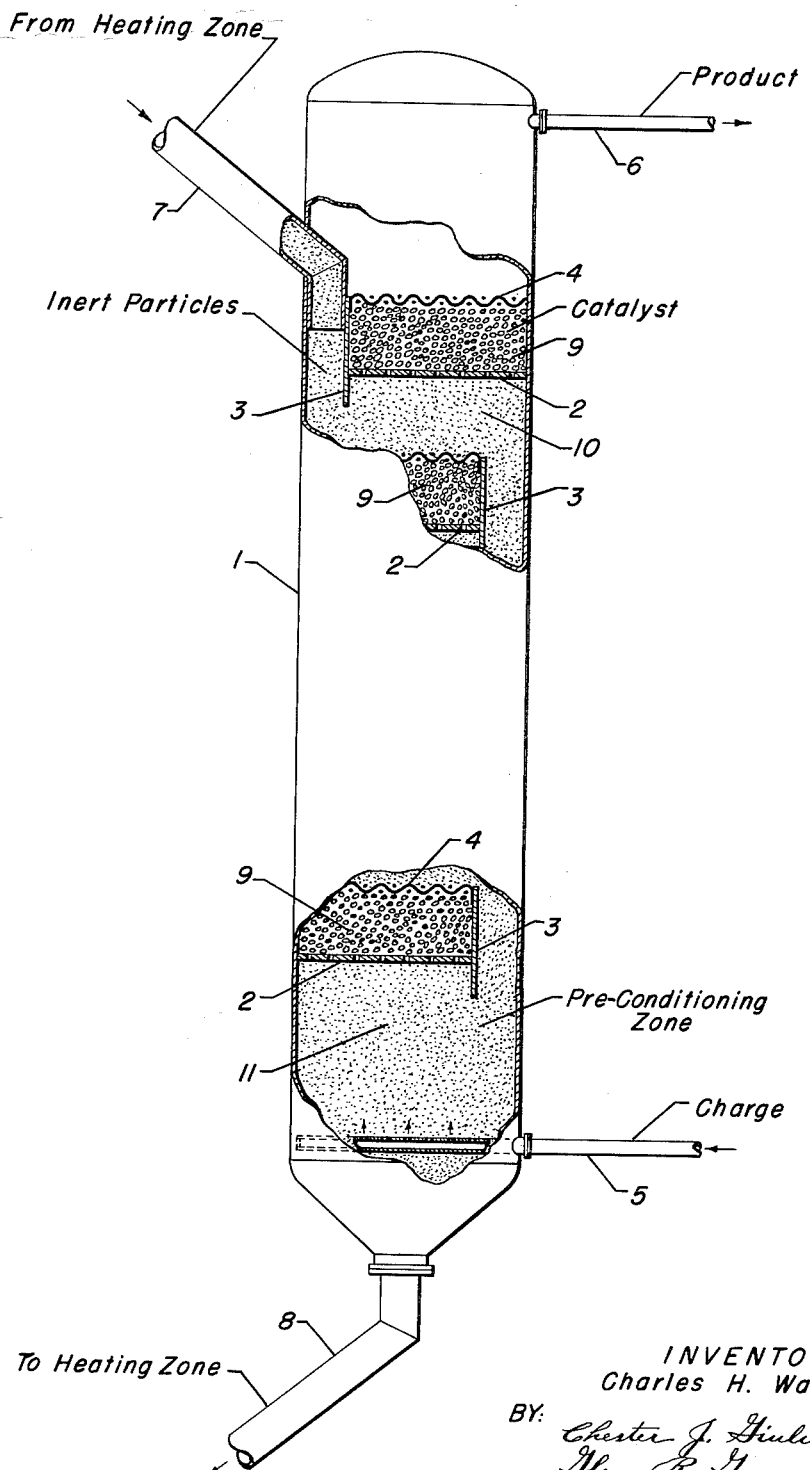

3,048,468
METHOD FOR EFFECTING CATALYZED REACTIONS
Charles H. Watkins, Arlington Heights, Ill., assignor, by mesne assignments, to Universal Oil Products Company, Des Plaines, Ill., a corporation of Delaware
Filed Dec. 20, 1956, Ser. No. 629,671
3 Claims. (Cl. 23—1)

This invention relates to a method for effecting catalyzed reactions and particularly to a method for effecting reactions which require large quantity heat transfer. This invention further relates to an apparatus which is peculiarly adapted for this method.

In many reactions, large quantity heat transfer requirements make processing difficult. Frequently, these heat transfers must be effected at high temperature which adds to the burden of the process by introducing the additional difficulties associated with high temperature processing. In these processes, which are usually characterized by containing either exothermic reactions or endothermic reactions, the heat transfer is usually effected by indirect heat exchange, however, this is difficult to achieve because the heat transfer through metal walls is slow, is not homogeneous wtih respect to the reacting medium and is limited by the temperature characteristics of the material from which the heat exchanger is made. It is very difficult to effect heat transfer in a catalyzed reaction, especially when a heterogeneous catalyst is employed and when such a heat transfer is necessary, it is usually accomplished by effecting the reaction in a series of reactors which have intermediate heat exchange means spaced between them. Another alternative is to dispose heat exchange coils directly in a reaction zone, however, as heretofore mentioned, this requires difficult construction, is limited by the temperature characteristics of the metal, causes nonhomogeneous heat transfer and is particularly unsatisfactory when the heat transfer must be effected in a corrosive or abrasive environment.

Exothermic reactions effected in a heterogeneous catalyst bed are characterized by a temperature rise as the material passes through the bed while endothermic reactions are characterized by a temperature drop. In either case, the temperature at which the material is charged to the bed is changed so that effecting the entire reaction in the same bed will result in most of it being at a temperature not optimum for the reaction. It is an object of this invention to provide a method and means for transferring large quantities of heat to and from a reaction promoted with a heterogeneous catalyst. It is another object to provide a method and means for transferring this heat at high temperatures if necessary and it is still another object of this invention to provide a process and apparatus which are well adapted to effecting reactions requiring large quantities of heat transfer in a most satisfactory manner, that is, catalyzed with a fixed bed of heterogeneous catalyst.

In one embodiment, this invention provides a method for effecting a catalyzed reaction which comprises passing reactant material into the lower portion of a vertically elongated reaction zone, passing said reactant material upwardly through a series of spaced catalyst beds, passing a stream of inert heat retentive particles into the upper portion of said reaction zone in sufficient quantity and at a temperature to maintain the reaction temperature within said reaction zone, passing said stream of particles in a generally downwardly direction and in a tortuous path between said catalyst beds, removing heat retentive particles from the lower portion of said reaction zone and recovering reaction product from the upper portion of said reaction zone.

In another embodiment, this invention relates to an apparatus suitable for effecting catalyzed reactions which comprises in combination an elongated vertical shell with horizontal perforated shelves spaced along the height thereof, conduit means providing communication through each of said shelves, fluid inlet and solid particle outlet means in the lower portion of said shell, fluid outlet and solid particle inlet means in the upper portion of said shell, catalyst particles retained on each of said shelves and flowing inert heat retentive particles disposed between said shelves.

In other embodiments the method and apparatus of this invention may be employed in conjunction with heating zones for inert particles and may be constructed and operated so that a portion of the vertical shell contiguous to the reaction zone may be employed as a charge stock preconditioning zone.

The method of this invention provides for a fixed bed of catalyst to promote a reaction between reagents and at the same time, provides for the benefits of direct heat transfer between the reactant stream and a flowing stream of solid inert heat retentive particles. This invention, therefore, combines the best feature both of direct heat transfer and of heterogeneous catalysis in a way that retains the benefits of both. These benefits are obtained by disposing a heterogeneous catalyst in a series of fixed beds so that as reactants pass through the beds and experience a temperature drop or rise, depending upon whether the reaction is exothermic or endothermic, the material will pass from the catalyst bed and the temperature will be adjusted to optimum reaction temperature before passing into the next subsequent bed. Therefore, regulating the depth of the catalyst bed, or the degree of reaction in some other way, the temperature change in passing through each bed may be regulated so that processing is always effected at optimum conditions. The material passing from each catalyst bed enters a laterally flowing stream of indirect heat transfer material wherein it is homogeneously reheated, readily separated from the solid particle stream and introduced into the next higher catalyst bed for further reaction.

This invention also provides the benefits of countercurrent flow between the reactants and the heat transfer medium so that as the concentration of reactants decreases and the concentration of product increases near the top of the reaction zone, the reaction conditions will be more favorable for effecting the reaction.

It is contemplated that a particle heater and elevator will be used in conjunction with the reactor of this invention and it will comprise an ordinary particle heater which is a vessel having means for introducing combustion supporting gases and fuel when the latter is necessary.

The heat transfer particles may be heated in such a vessel to a temperature substantially higher than the temperature at which the shell of the vessel is maintained since the heat is not transferred through the metallic shell, but is introduced directly into the heat transfer medium. In this manner, the hottest portion of the entire assembly is in the inert heat transfer particles. The metal shell containing the hot particles and heating medium, when suitably insulated, may be cool enough to be touched. A conventional elevating means which may be employed before, after or during the particle reheating or cooling will also be employed. This means may be mechanical or pneumatic and may be carried on in conjunction with the temperature adjustment, for example by using combustion gases as a lifting medium.

Besides the ability to produce higher temperatures, the direct heat exchange method provides a superior method of transferring the heat by introducing it directly into the reaction zone and homogeneously throughout the reactant stream. The amount of heat transferred may be readily controlled by regulating the temperature of the particles, the quantity that passes through the reaction zone or both of these variables and no matter what temperature or what quantity of particles are employed, the homogeneity of the heat transfer is maintained.

There are many highly exothermic and endothermic reactions which require the large scale heat transfer for which this invention is well adapted. Some of the endothermic reactions which require large heat inputs include but are not limited to hydrogen production by the reaction of hydrocarbon and water where not only large heat input is required but it is necessary at high temperature, manufacture of ethylene from ethane or other hydrocarbons, the manufacture of acetylene, the manufacture of aromatics and others.

Some highly exothermic reactions which require massive heat removal are hydrogenation of hydrocarbons, production of phthalic anhydride by oxidation of naphthalene, production of maleic anhydride and others. Other processes which require large heat transfer into charge stocks include reforming of gasolines wherein the net of many reactions is endothermic, hydrocracking, alkylation, etc.

The apparatus and method of this invention may be best described with reference to the accompanying drawing which illustrates one embodiment thereof and is intended to be illustrative rather than limiting upon its broad scope.

In the drawing there is illustrated in partial sectional view a vertical cylindrical shell 1 containing a series of horizontal vertically spaced perforated shelves or trays 2. Each of these shelves or trays has a vertical partition 3 attached thereto which forms a container by connecting it to the shelf 2 and the wall of the shell 1 and similarly forms a conduit connecting the region above each shelf 2 with the region below it. Partition 3 may also extend below shelf 2 thereby helping to force the rising gases through the catalyst bed. When necessary, a screen or other perforate means 4 is disposed above the partition 3 and within the space between the screen 4 and the shelf 2 is disposed a catalyst bed 9 containing particles of catalyst.

Conduit 7 connects the upper portion of shell 1 to a heating zone and through it inert particles 10 are introduced into shell 1. These particles are introduced below the top of shell 1 so that a vapor space is maintained above the point of introduction. The inert particles pass downwardly through a tortuous path, in this case, a zigzag path so that they pass laterally above each shelf, then downwardly to the next lower shelf and laterally above that one. This flow is caused by maintaining the conduit means between trays in diametric opposition to each other. Ultimately, the flowing stream of inert particles is removed from the lower portion of shell 1 through line 8 and, when employed in a cyclic flow between the reaction zone and the heating zone, these particles may be returned to the heating zone to be reheated and returned to conduit 7 to repeat the cycle just described.

The charge to the vessel is introduced through line 5 in the lower portion thereof and product is removed through line 6 discharging from shell 1 in the vapor space heretofore described. When desired, contiguous preconditioning zone 11 may be maintained below the lowermost shelf contained in shell 1 which will perform the function of conditioning the charge prior to its first contact with catalyst 9.

Having described the physical reaction vessel, its function will now be discussed in greater detail. As heretofore stated, the main object of this invention is to provide a reaction zone and process wherein the benefits both of fixed bed contact and direct heat exchange are obtainable. The catalyst employed in this invention will, of course, be adapted to the process which is to be effected.

Suitable catalysts which are typical of those which may be used are such materials as vanadium, chromium, molybdenum, tungsten, manganese, iron, cobalt, nickel, palladium, platinum, copper, silver, gold, zinc, cadmium, tin, bismuth, or compounds of these such as their oxides, sulfides, halides, etc. or mixtures of any of these, etc., which are supported on such supporting materials as silica, alumina, zirconia, magnesia, titania, thoria, boria, etc., or mixtures thereof. By way of example only, when the present method is used for effecting hydrogenation, a catalyst such as nickel on silica, platinum on alumina, or iron on charcoal, may be used or when effecting such reactions as desulfurizing gasolines such catalysts as cobalt and molybdenum on alumina or cobalt and molybdenum on silica-alumina may be employed. When oxidizing naphthalene to phthalic anhydride, a catalyst such as vanadia on alumina may be employed and numerous other mixtures of the above mentioned metals and supporting materials which are known to the art may be employed.

The direct heat exchange particles used will be selected primarily for their resistance to temperature change and their inertness with respect to reagents and the reaction, however, an exception to the above is that the heat exchange particles may assert a mild catalytic influence for promoting the reactions desired. Typically, the heat exchange particles will be of materials such as sand, clay, silica, metal, etc., however, the heat exchange particles may be spent catalyst of the type employed in processing or a base upon which that catalyst is disposed.

The catalyst particles may be larger than the inert heat transfer particles or smaller than the inert heat transfer particles. When the catalyst particles are sufficiently large so that they will be retained on the perforated shelves by gravity even when an upflowing stream of reactants passes through them, an upper retaining screen 4 will not be necessary and the smaller inert particles will be continuously removed from the catalyst bed by elutriation. When, however, the inert particles are larger than the catalyst particles or when the catalyst particles would be fluidized from the perforated shelves during processing, it is necessary to retain them on shelves 2 by means of a complete enclosure including screen 4. There may be variations of this processing technique such as, for example, having a small opening so that fresh catalyst may be continuously added to each shelf while spent catalyst becomes part of the flowing inert particle stream and is thus removed from the reaction zone.

In use, the charge to the process enters through line 5 and, when necessary, is preconditioned in preconditioning zone 11. Preconditioning zone 11 may simply heat the charge to reaction emperature or it may vaporize the charge or effect a preconditioning reaction, such as the precipitation of coke-forming materials on the inert particles with the resultant removal of this material from the charge. The preconditioning zone at any rate provides a rising vapor phase reactant stream at reaction conditions for introduction through the perforations in shelf 2 and into the catalyst bed 9 on the lowermost of the perforated shelves.

Within catalyst bed 9 a reaction is effected which may be either endothermic or exothermic and which results in a temperature change as the material passes through the lowermost bed. The depth of the bed is predetermined so that too great a temperature change is not effected by the reactants while they are in transit through the bed and they emerge from it and enter a different portion of the flowing direct heat exchange stream before passing through the next higher perforated shelf 2 and into the next higher catalyst bed. This process is repeated over and over again through as many catalyst beds as are desired until the product ultimately emerges from the uppermost catalyst bed and into the vapor space and from there it is withdrawn through line 6 as product. As the reaction proceeds, deeper catalyst beds may be employed or catalyst beds having different catalysts. Thus, as the concentration of reactants diminishes and the concentration of product increases, the catalyst in higher catalyst beds might be prepared to contain a higher metal concentration, a different more active metal, a deeper bed of the same catalyst or any combination of these.

As a specific example of a process which may be better effected by the method and in the apparatus of this invention, hydrogen production by way of the water-gas or producer-gas reactions are typical. A hydrocarbon, such as methane, may be mixed with steam and the mixture raised to a temperature of around 2000° F. to produce hydrogen, carbon monoxide, carbon dioxide and carbon. This reaction may be beneficially effected in the presence of a catalyst such as platinum on alumina or nickel on charcoal and when effected in the presence of a catalyst, it may take place at milder temperatures of around 1500° F. which are easier to obtain and cause increased yields due to more favorable equilibrium of products. This reaction, however, not only must be effected at high temperature but it is highly endothermic and requires a great deal of heat input at that high temperature to maintain the reaction conditions. According to the process of this invention, a mixture of steam and hydrocarbon which may be any hydrocarbon from methane to heavy liquid oils, are introduced through line 5 or alternatively, the hydrocarbon may be introduced through line 5 and the steam through another line similar to line 5 but at a lower elevation so that it performs a double function of being a reactant and a stripping medium which prevents hydrocarbon from passing out of the reaction zone entrained on the particles passing through line 8.

The particles between the charge introduction point and the lowermost catalyst bed act as a preconditioning zone to vaporize the hydrocarbon and heat it to reaction conditions. When heavy oils are used, the preconditioning zone 11 may also convert the charge to a vapor phase and a solid phase, the solid phase being removed as a coating on the sand particles to be burned in the heating zone wherein this usually harmful material is used beneficially as fuel. The rising vapors of hydrocarbon and steam then contact the catalyst bed 9 without forming harmful deposits therein, however, in catalyst bed 9 the water-gas reaction is initiated so that hydrogen is formed along with carbon monoxide and carbon dioxide and a temperature drop is experienced. Before the temperature of the reactant stream falls below that at which a reaction is effected, the reactants leave the lowermost catalyst bed 9 and enter another portion of the stream of heat exchange particles flowing downwardly through column 1. The partially reacted stream is then reheated to reaction conditions and again introduced into another catalyst bed 9 for additional reaction and temperature drop. Again, the partially reacted stream is removed from the catalyst bed, reheated and reintroduced into another catalyst bed and this process is repeated over and over again until the material emerging from the uppermost catalyst bed, which is substantially completely reacted, is withdrawn through product line 6.

The inert direct heat exchange material which for purposes of this discussion is sand, will enter through line 7 at a temperature in the range of from about 1500° F. to about 2000° F. The rate at which the sand passes through column 1 will depend upon the amount of reaction being effected so that sand passing between the lowermost two catalyst beds will be sufficiently hot to raise the temperature of the partially reacted mixture to at least 1500° F.

The product emerging through line 6 as heretofore stated will comprise hydrogen, carbon monoxide and carbon dioxide and may be subjected to an equilibrium shift reaction wherein additional steam is reacted with carbon monoxide to produce additional hydrogen and carbon dioxide. Also, the product may be treated to enrich the hydrogen content, for example, by scrubbing it with an alkaline medium to remove the acid acting carbon dioxide from the gas.

As another example of a specific process which is particularly suitable for being effected by this method, naphthalene may be partially oxidized to produce phthalic anhydride, a very valuable starting material for chemical synthesis. This process is presently effected with great difficulty and the primary problem is avoiding runaway temperatures due to the high exothermicity of the reaction and the fact that it is promoted by high temperatures. Various methods have been employed and all generally comprise extreme dilution of the reactants or very brief contact times at reaction conditions to prevent the runaway temperature which not only endangers personnel and equipment but destroys the desired product.

By introducing naphthalene and oxygen into the lowermost portion of column 1 and employing a vanadium pentoxide catalyst supported on alumina in catalyst beds 9, this reaction may be readily effected. The inert direct heat exchange material in this case, however, will be relatively cool and will be used as a means for removing heat from the reaction zone. The hot inert material withdrawn through line 8 will be transferred to a cooling zone wherein heat will be removed from it, for example, by blowing it as a fluidized bed with air. In this manner the cooling air need not be used actually in the reaction zone where it causes dilution of reactants as it cools. The cool sand, however, which does not contaminate or dilute the reactant stream and has much higher heat capacity per unit of volume than cooling gases may be used to homogeneously remove large quantities of heat while still maintaining high concentration of reactants in the presence of a heterogeneous catalyst. The inert heat exchange material will be provided to the reaction zone in sufficient quantity and at sufficiently low temperature to maintain the reaction zone at a temperature of from about 650° F. to a maximum temperature of about 1100° F. With such temperature control and heat removal as this, theoretical yields better than 90% phthalic anhydride per pass have been obtained whereas lower yields, below 75%, are all that can be obtained per pass in other processes.

The method and apparatus of this invention lend themselves to many equivalent variations which are nonetheless within the scope of the invention. For example, the perforated shelves and interstage conduits may be as shown or may be in the form of screens, perforated decks, or any other perforated means. Furthermore, the shelves may be arranged in staggered arrangement as herein shown and described or in any other way which causes a tortuous indirect flow of inert heat exchange material. For example, the shelves could be arranged so that some are annulus shaped with a small hole in the middle for the flowing stream of solids while alternate plates are disk shaped and disposed so that the solids must pass over the periphery between the disk and the wall of the main shell. Furthermore, the conduits providing passageway through each perforated shelf may be as shown, constructed merely by a vertical partition, sealed against the wall of the chamber to form a passageway of chordal cross section or they may be one or more cylindrical tubes arranged in staggered relationship throughout the column. It is clear that many other variations of this equipment may be employed as well as certain pumps, compressors, valves, charge distributing means, etc., which are commonly used with equipment of this nature.

I claim as my invention:

1. The method for effecting a catalyzed reaction which comprises introducing reactant material into the lower portion of a vertically elongated reaction zone, passing said reactant material upwardly through a series of vertically spaced horizontal catalyst beds in said zone, introducing a stream of inert heat retentive particles into the upper portion of said reaction zone in sufficient quantity and at a temperature to maintain the desired reaction temperature within said reaction zone, passing said stream of particles in a generally downward direction through said zone countercurrent to said reactant material and laterally across the reaction zone between said catalyst beds, removing heat retentive particles from the lower portion of said reaction zone and recovering product from the upper portion of said reaction zone.

2. The method for effecting an endothermic catalyzed reaction which comprises introducing reactant material into the lower portion of a vertically elongated reaction zone, passing said reactant material upwardly through a series of vertically spaced horizontal catalyst beds in said zone, introducing a stream of hot inert heat retentive particles into the upper portion of said reaction zone in sufficient quantity and at a high enough temperature to supply the necessary endothermic heat of reaction and maintain the reaction zone at the desired reaction temperature, passing said stream of particles in a generally downward direction through said zone and laterally across the reaction zone between said catalyst beds, removing heat retentive particles from the lower portion of said reaction zone and recovering product from the upper portion of said reaction zone.

3. The method for effecting an exothermic catalyzed reaction which comprises introducing reactant material into the lower portion of a vertically elongated reaction zone, passing said reactant material upwardly through a series of vertically spaced horizontal catalyst beds in said zone, introducing a stream of relatively cool inert heat retentive particles into the upper portion of said reaction zone in sufficient quantity and at a sufficiently low temperature to remove the exothermic reaction heat and maintain the reaction zone at the desired reaction temperature, passing said stream of particles in a generally downward direction through said zone and laterally across the reaction zone between said catalyst beds, removing heat retentive particles from the lower portion of said reaction zone and recovering product from the upper portion of said reaction zone.

References Cited in the file of this patent

UNITED STATES PATENTS

| | | |
|---|---|---|
| 2,531,068 | Maust | Nov. 21, 1950 |
| 2,662,003 | Waddill et al. | Dec. 8, 1953 |
| 2,685,498 | Dickinson | Aug. 3, 1954 |
| 2,716,587 | Hillard | Aug. 30, 1955 |
| 2,751,420 | Huebner | June 19, 1956 |
| 2,762,683 | Massey | Sept. 11, 1956 |